United States Patent [19]

Chen

[11] Patent Number: 5,460,722
[45] Date of Patent: Oct. 24, 1995

[54] BIOCHEMICAL DRIPPING BOARD FOR AQUARIUMS

[76] Inventor: Shan-Hu Chen, 483 Hsin-Sing Road, Tainan, Taiwan

[21] Appl. No.: 320,930

[22] Filed: Oct. 11, 1994

[51] Int. Cl.⁶ ............................................. A01K 63/04
[52] U.S. Cl. ..................... 210/615; 210/629; 210/169; 210/150; 119/260; 119/261
[58] Field of Search ........................ 210/169, 150, 210/151, 615, 629; 119/227, 259, 260, 261, 262, 263

[56] References Cited

U.S. PATENT DOCUMENTS

| | | | |
|---|---|---|---|
| 2,275,428 | 3/1942 | Haldeman | 210/169 |
| 3,477,679 | 11/1969 | Lovitz | 210/169 |
| 3,717,123 | 2/1973 | Regnier | 210/169 |
| 4,427,548 | 1/1984 | Quick, Jr. | 119/227 |
| 4,861,465 | 8/1989 | Augustyniak | 119/227 |
| 4,915,828 | 4/1990 | Meyers et al. | 210/110 |
| 4,966,096 | 10/1990 | Adey | 119/260 |
| 5,059,315 | 10/1991 | Senape | 210/169 |
| 5,096,576 | 3/1992 | Szabo | 119/260 |
| 5,108,594 | 4/1992 | Giovanetti et al. | 119/260 |
| 5,139,656 | 8/1992 | Gonnello | 119/259 |
| 5,176,100 | 1/1993 | Fujino | 119/259 |
| 5,176,824 | 1/1993 | Willinger et al. | 119/260 |
| 5,205,237 | 4/1993 | Skeggs et al. | 119/263 |
| 5,397,463 | 3/1995 | Woltmann | 210/169 |
| 5,409,603 | 4/1995 | Tsung | 210/169 |

*Primary Examiner*—Cynthia L. Nessler
*Attorney, Agent, or Firm*—Bacon & Thomas

[57] ABSTRACT

A biochemical drip board for aquariums formed of a flat board having a plurality of short posts extending down from the bottom, and at least a hanger at one end, each said short post having a very small center through hole to function as a capillary to slow down speed of water flowing therethrough and to cultivate active nitrate bacteria therein for disintegrating organic matters in water into nitrogen and ammonia and consequently preventing water from worsening.

4 Claims, 4 Drawing Sheets

BIOCHEMICAL DRIPPING BOARD FOR AQUARIUMS

This invention relates to a biochemical drip board for aquariums, particularly to one slowing down speed of water flowing therethrough for increasing oxygen contained in water to cultivate active nitrate bacteria.

A known conventional drip board 12 used in aquariums is deposited on a filter case 1 as shown in FIG. 1, and the filter case 1 has a filter sponge 10, a side plate 11, and a water exit 13. Then the water in a aquarium is pumped by a motor pump into a to guide tube to drop on the dripping board 12, through which the water falls down on the filter sponge 10 and then through the filter sponge 10 to flow down through the exit 13. However, the drip board 12 has not enough dimensions to let water drip all over the filter sponge 10, but only on the intermediate portion of the filter sponge 10. So after a period of use, small miscellaneous matters accumulate on the intermediate portion of the filter sponge 10, lowering filtering capacity of the filter sponge 10, and consequently not increasing oxygen contained in water, impossible to cultivate active nitrate bacteria for disintegrating organic matters such as fish waste, leftover feed, etc. in water into nitrogen and ammonia. Then, the water in a aquarium may worsen to produce bad odor and impair health of fish kept therein.

SUMMARY OF THE INVENTION

A main object of this invention is to offer a biochemical drip board for aquariums, which can cultivate a large number of active nitrate bacteria for disintegrating organic matters in water.

A main feature of this invention is a biochemical drip board provided with many short posts extending down from the bottom, and each short post has a very small center through hole to function as a capillary for water to slowly flow through to drip down on a filter sponge so that active nitrate bacteria may be cultivated in the hole for disintegrating organic matters in water.

DETAILED DESCRIPTION OF THE INVENTION

Figure 1:
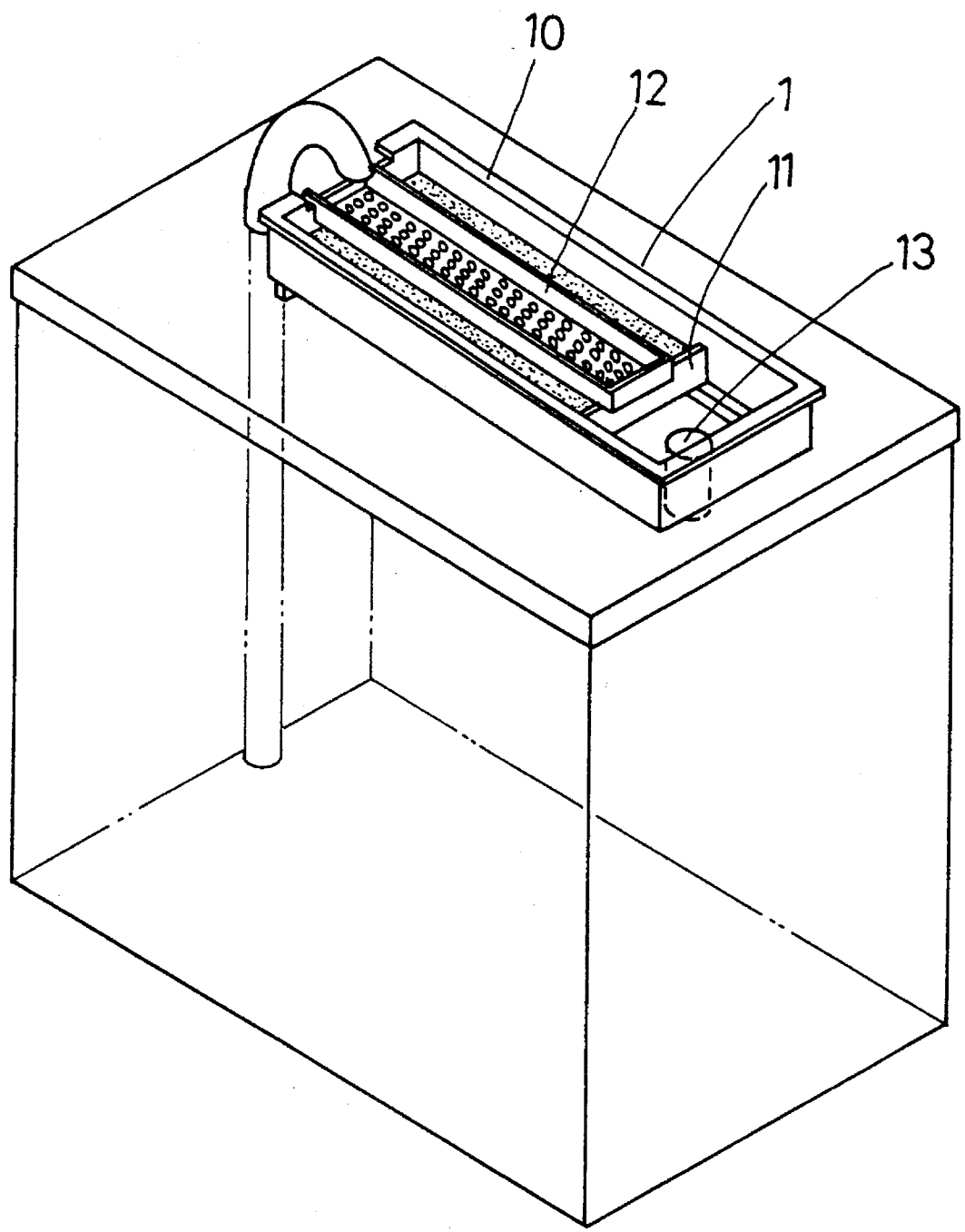
FIG. 1 is a perspective view of a conventional biochemical drip board used in an aquarium.
Figure 2:
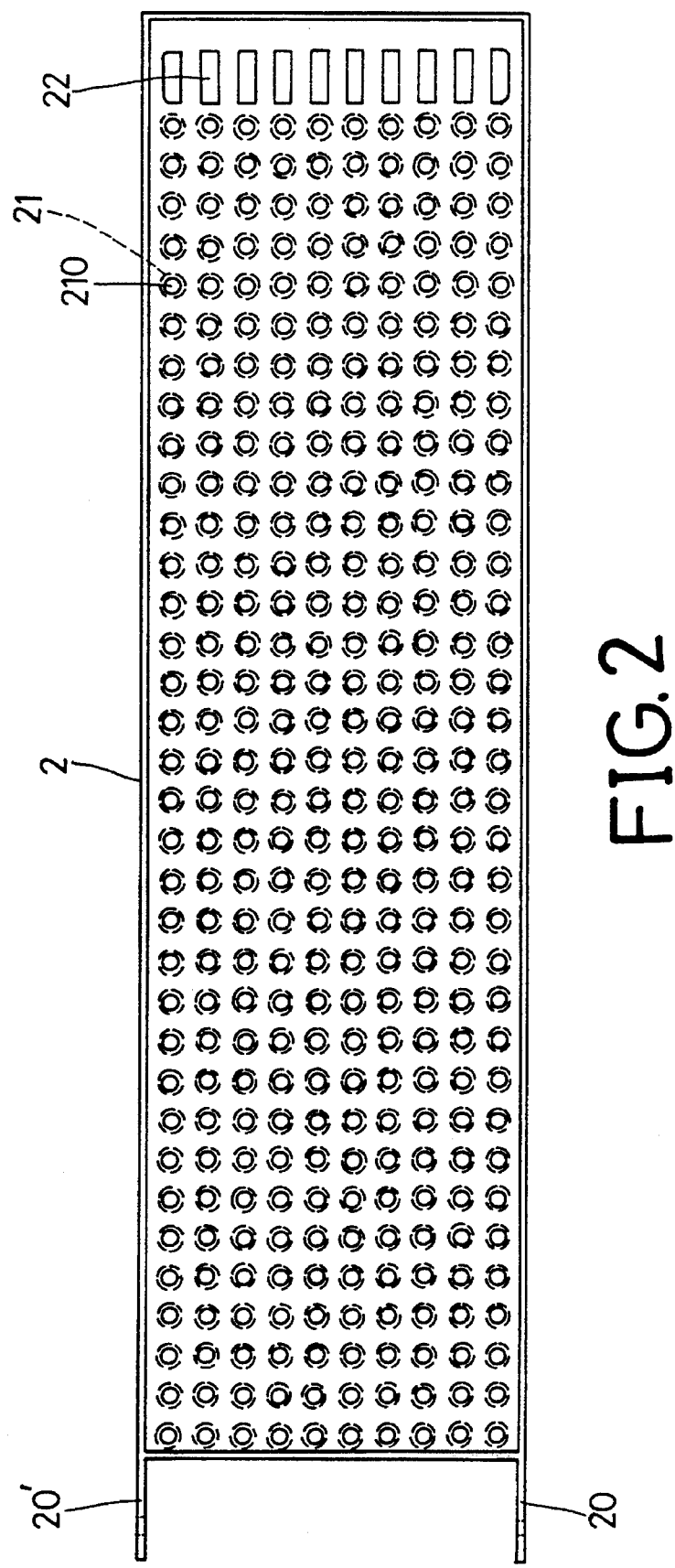
FIG. 2 is an upside view of a biochemical drip board for aquariums in the present invention.
Figure 3:
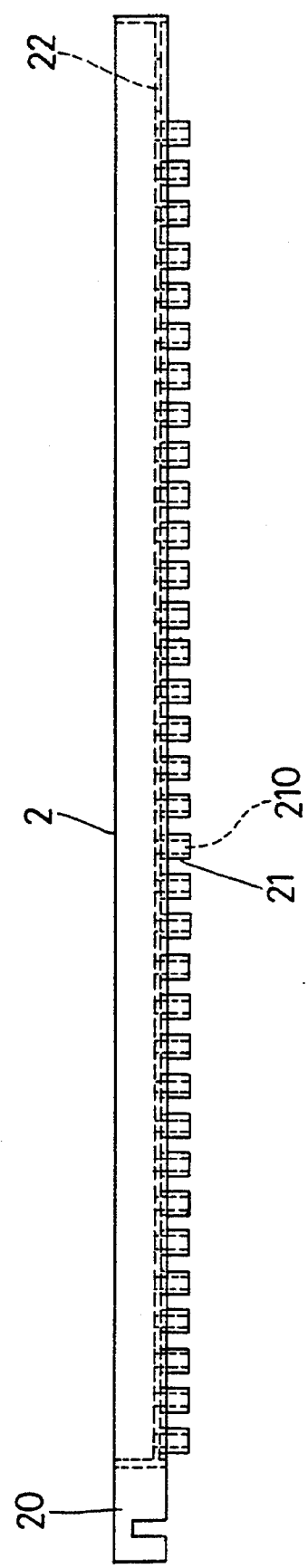
FIG. 3 is a side view of the biochemical drip board for aquariums in the present invention.

A biochemical drip board for aquariums in the present invention, as shown in FIGS. 2 and 3, is formed of a flat drip board 2 of a rectangular shape, having two projecting hangers 20, 20' at the left end, a plurality of projecting-down short posts 21 respectively provided with a very small through hole 210, a plurality of rectangular holes 22 spaced in a lateral line at the right end.

Figure 4:
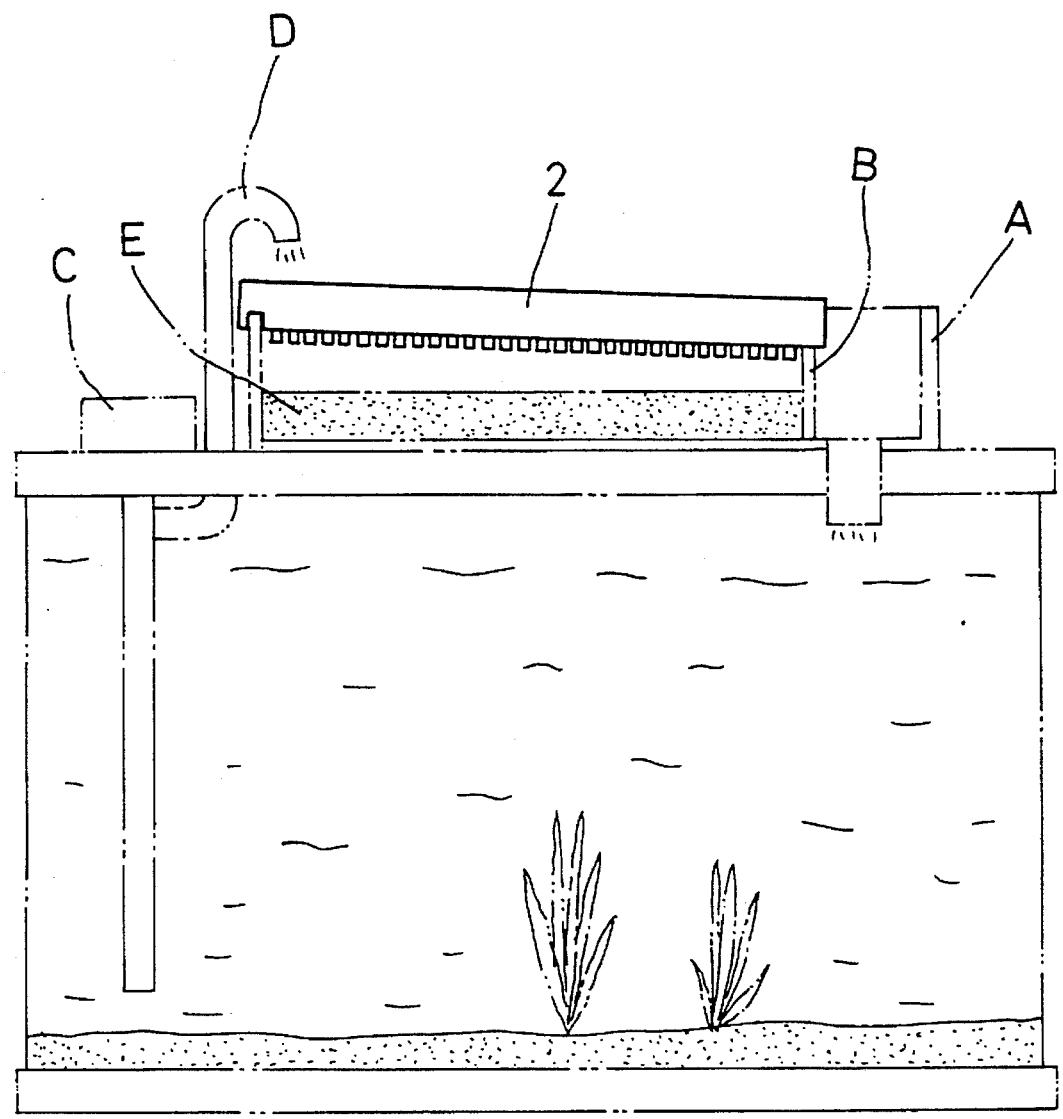
FIG. 4 is a side view of the biochemical drip board deposited on a filter case fixed on an aquarium in the present invention.

In using, referring to FIG. 4, the biochemical drip board 2 is deposited on a filter case A placed on a aquarium, and the two hangers 20, 20' are hung on the left side wall of the filter case A with the right side of the board 9 placed on a stop plate B When water is pumped into a water guide tube D in the aquarium by a motor pump C, the water will flow out of an outer end of the water guide tube D located above the aquarium. Then the water will flow all over the board 2 and drip down through the holes 210 of the projecting short posts 21 on to a filter sponge plate E Therefore, there is a very broad dimensions for dripping, permitting the filter sponge plate E filter small miscellaneous matter such as fish waste, leftover feed, etc, and the holes 210 of the short posts 21 function as capillaries, slowing down water flowing speed, and thus increasing oxygen contained in the water, and further more, cultivating active nitrate bacteria in the holes 210 of the snort posts 21 so that organic matter in the water may be disintegrated into nitrogen and ammonia, preventing effectively water from worsening and permitting fish in an aquarium live healthy.

It is evident from the above description that this invention has advantages as follows.

1. It can make the filter sponge plate filter completely and effectively small miscellaneous matters off water.

2. Slowed clown water speed can increase oxygen contained in water and let the holes 210 of the short posts 21 largely cultivate active nitrate bacteria.

3. As active nitrate bacteria can attach in the holes 210 of the short posts 21, organic matters flowing through the holes 210 can effectively be disintegrated, preventing the water from worsening.

What is claimed is:

1. In a method of cleaning water in an aquarium wherein water from the aquarium is recirculated through a biochemical drip board, wherein the improvement comprises the use of a biochemical drip board formed of a flat board having a plurality of short posts extending down from the bottom, at least a hanger provided at one end of said board, a plurality of holes at the other end of said board, each of said short posts respectively having a very small center through hole, said hole having active nitrate bacteria attached thereto and functioning as a capillary not only to slow down the speed of water flowing therethrough but to increase oxygen contained in the water and further more to cultivate active nitrate bacteria therein in a large number so that organic matters in the water are disintegrated into ammonia and nitrogen, consequently effectively preventing water from worsening.

2. The method of claim 1, wherein the plurality of holes at the other end of the board opposite the hangers have a rectangular shape and are spaced laterally in a line.

3. In a recirculating aquarium water biochemical filtration system comprising a housing having at least one sidewall, an inlet for receiving water from the aquarium, and an outlet for directing treated water to the aquarium, the improvement comprising a biochemical drip board for receiving water from said inlet and being formed of a flat board having a plurality of short posts extending down from the bottom of said board, at least one hanger provided at one end of said board, said hanger being connectible to said at least one sidewall, and a plurality of holes at the other end of said board, each of said short posts respectively having a very small center through hole, said hole having active nitrate bacteria attached thereto, said hole defining capillary means for slowing down the speed of water flowing therethrough, for increasing oxygen contained in the water, and for cultivating said active nitrate bacteria therein in a large number so that organic matters in the water are disintegrated into ammonia and nitrogen, consequently effectively preventing said water from worsening.

4. The system of claim 3, wherein the plurality of holes at the other end of the board opposite the hangers have a rectangular shape and are spaced laterally in a line.

* * * * *